(12) United States Patent
Torres

(10) Patent No.: US 8,983,545 B2
(45) Date of Patent: *Mar. 17, 2015

(54) AUTOMATIC SELECTION OF SIM CARD FOR MULTI-SIM MOBILE DEVICES

(71) Applicant: BMobile LLC, Wilmington, DE (US)

(72) Inventor: Fernando Torres, Managua (NI)

(73) Assignee: BMobile LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,736

(22) Filed: May 19, 2014

(65) Prior Publication Data
US 2014/0335915 A1    Nov. 13, 2014

Related U.S. Application Data

(63) Continuation of application No. 13/929,583, filed on Jun. 27, 2013, now Pat. No. 8,768,414, which is a continuation of application No. 13/481,728, filed on May 25, 2012, now Pat. No. 8,478,341.

(60) Provisional application No. 61/563,768, filed on Nov. 26, 2011.

(51) Int. Cl.
H04B 1/38    (2006.01)
H04W 8/18   (2009.01)

(52) U.S. Cl.
CPC .............. H04B 1/3816 (2013.01); H04W 8/183 (2013.01); Y10S 902/26 (2013.01)
USPC .................. 455/558; 379/433.09; 379/211.05; 902/26

(58) Field of Classification Search
USPC ...................... 455/558, 411, 427, 556.1, 557; 235/492; 379/433.09, 211.05; 902/26
See application file for complete search history.

(56) References Cited

U.S. PATENT DOCUMENTS

| | | | |
|---|---|---|---|
| 7,848,781 B2 | 12/2010 | Bhat et al. | |
| 8,478,341 B2 * | 7/2013 | Torres | 455/558 |
| 8,768,414 B2 * | 7/2014 | Torres | 455/558 |
| 2008/0020773 A1 | 1/2008 | Black et al. | |
| 2010/0009716 A1 | 1/2010 | Lee et al. | |
| 2010/0203867 A1 | 8/2010 | Wu | |

(Continued)

FOREIGN PATENT DOCUMENTS

KR    2010-0007139    1/2010

OTHER PUBLICATIONS

PCT International Search Report and Written Opinion, PCT/US2012/046788, Jan. 31, 2013, 7 Pages.
Notice of Preliminary Rejection for Korean Patent Application No. KR 2014-70039763, Apr. 1, 2014, 9 Pages.

(Continued)

Primary Examiner — Nay A Maung
Assistant Examiner — Angelica M Perez
(74) Attorney, Agent, or Firm — Fenwick & West LLP

(57) ABSTRACT

A mobile device includes multiple subscriber identification module (SIM) cards. When a user of the mobile device requests to call a phone number, the mobile device determines a mobile telecommunications service provider of the phone number, based on service provider information received for the phone number from a service mapping server. The mobile device selects for the call a SIM card from the multiple SIM cards that is associated with the determined service provider of the phone number. The mobile device places the call to the phone number using the selected SIM card.

20 Claims, 7 Drawing Sheets

(56) References Cited

U.S. PATENT DOCUMENTS

| | | |
|---|---|---|
| 2011/0028135 A1 | 2/2011 | Srinivasan |
| 2011/0077003 A1 | 3/2011 | Shin |
| 2011/0081951 A1 | 4/2011 | Hwang |

OTHER PUBLICATIONS

Office Action for U.S. Appl. No. 13/929,583, Sep. 25, 2013, 12 Pages.
Office Action for U.S. Appl. No. 13/481,728, Sep. 25, 2012, 11 Pages.

* cited by examiner

US 8,983,545 B2

AUTOMATIC SELECTION OF SIM CARD FOR MULTI-SIM MOBILE DEVICES

CROSS-REFERENCE TO RELATED APPLICATIONS

This application is a continuation of U.S. patent application Ser. No. 13/929,583, filed Jun. 27, 2013, which is a continuation of U.S. patent application Ser. No. 13/481,728, filed May 25, 2012, which claims the benefit of U.S. Provisional Application No. 61/563,768, filed Nov. 26, 2011. Each of these applications is incorporated by reference herein in their entirety.

BACKGROUND OF THE INVENTION

1. Field of the Invention

This invention pertains in general to mobile devices and more specifically to mobile devices with multiple subscriber identification module (SIM) cards ("multi-SIM mobile devices").

2. Description of the Related Art

Many mobile devices, such as cell phones, smart phones, and the like include a subscriber identification module (SIM) card. The SIM card of a cell phone, for example, stores information that allows the phone to access the network of a service provider to communicate with other devices. When a user uses the cell phone to call a phone number that is associated with a different service provider than that of the SIM card, the call has to traverse between service provider networks. In some countries, service providers charge inter-carrier fees to users for calls that traverse between service provider networks. Thus, there is a need for a way for users to avoid having to pay inter-carrier fees for calls that traverse between service provider networks.

BRIEF SUMMARY OF THE INVENTION

Methods, computer program products, and computer systems are described for processing requests to place calls on mobile devices having multiple subscriber identification module (SIM) cards. When a user of the mobile device requests to call a phone number, the mobile device determines a mobile telecommunications service provider of the phone number, based on service provider information received for the phone number from a service mapping server. The mobile device selects for the call a SIM card from the multiple SIM cards that is associated with the determined service provider of the phone number. The mobile device places the call to the phone number using the selected SIM card. In this manner, since the call is made using the determined service provider of the phone number, inter-carrier charges to the caller are avoided.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

I. Overview

Figure 1:
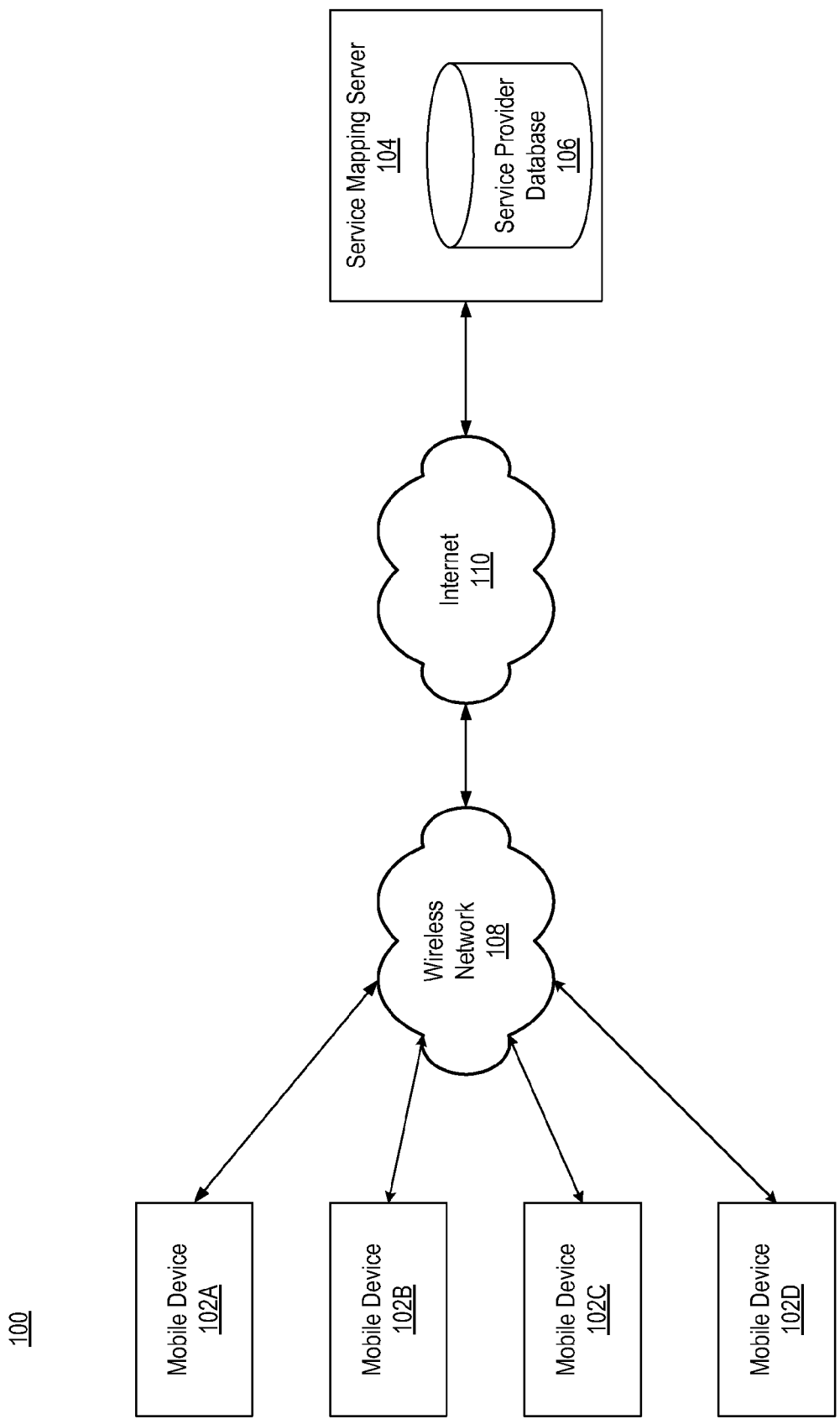
FIG. 1 is a block diagram illustrating a mobile communications environment according to one embodiment.

FIG. 1 is a high-level block diagram of a mobile communications environment 100 according to one embodiment. FIG. 1 illustrates four mobile devices 102 and a service mapping server 104 connected via a wireless network 108 and the Internet 110. Although the illustrated environment 100 only shows a few of mobile devices 102, in practice there may be hundreds of thousands, even millions of mobile devices 102 operating concurrently.

FIG. 1 uses like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral (e.g. "102" in the text refers to reference numerals "102A," "102B," "102C," and/or "102D" in the figures).

The mobile devices 102 are devices that are configured to make and receive calls over the wireless network 108. The mobile devices 102 can also be used to access the Internet 110 via the wireless network 108. Each mobile device 102 includes an operating system, such as Android, iOS, Nucleus, Brew, ThreadX or Infineon OS.

In one embodiment, each mobile device 102 of the mobile communications environment 100 includes multiple subscriber identity module (SIM) cards. For example, various mobile devices 102 are available that have capacity for two or four SIM cards. Each SIM card is associated with a specific, individual mobile telecommunications service provider (also known as a Multiple Network Operator or "MNO"), and stores identifying information (e.g., an IMSI of the subscriber, an authentication key, and/or a phone number of the subscriber) that allows a mobile device 102 to access the network of the mobile telecommunications service provider. As an example, a mobile device 102 may include two SIM cards. SIM Card #1 may be for accessing the network of service provider A and SIM Card #2 may be for accessing the network of service provider B.

In one embodiment, when a mobile device 102 receives a request from a user to call a phone number, either through direct keypad entry of the phone number, selection of a contact in the mobile device's contact directory, or selection of a phone number via hyperlink or other means, the mobile device 102 determines the service provider of the phone number using the phone number itself. More specifically, the mobile device 102 determines the service provider by transmitting all or part of the phone number to the service mapping server 104. The service mapping server 104 maintains a service provider database 106 that associates (e.g., indexes or cross-references) phone numbers with the service provider that controls that network to which phone numbers are assigned. The mapping server 104 thus uses the received information to lookup the service provider associated with the phone number. The service mapping server 104 returns service provider information (e.g., an identifier of the service provider) to the mobile device 102. The mobile device 102 activates the SIM card for the identified service provider, and places the call to the phone number using that the activated SIM card.

Continuing with the example from above, assume the mobile device 102 receives a request to place a call to the phone number (999) 321-9876. The mobile device 102 can transmit this phone number (or a portion thereof, such as area code and exchange) and additional information to the service mapping server 104, which in turn can determine that the phone number is assigned to service provider B. In this example, the mobile device 102 would place the call using the SIM card for service provider B. If the mobile device 102 does not have a SIM card for the identified service provider, another SIM card can be selected, such as the user's home SIM card, a default alternative SIM card, or the like.

The ability of a mobile device 102 to automatically select the SIM card for a call based on service provider information received from the service mapping server 104 is referred to as automatic SIM card selection feature. With the automatic SIM card selection, since a call is made to a phone number using the network of the call recipient's service provider, it allows the user of the device 102 to avoid fees charged when calls traverse between multiple service provider networks (i.e., inter-carrier fees).

In one embodiment, a user of a mobile device 102 can enable or disable the automatic SIM card selection feature. For example, a user can enable or disable the feature for all calls placed by a mobile device 102. In one embodiment, the feature can be enabled or disabled on an individual basis for particular phone numbers, as selected by the user. For example, a user may enable the feature for phone number A and disable the feature for phone number B. Further, the feature can be enabled or disabled for individual contacts of the user, with respect to all of contact's phone numbers. For example, the user can enable the feature to be used with all of the numbers of contact X and none of the phone numbers of contact Y.

The service mapping server 104 provides service provider information to mobile devices 102 of the mobile communications environment 100. The service mapping server 104 includes a service provider database 106 that stores phone numbers in association with service provider information. The service provider information of a phone number includes information that indicates the servicer provider of the phone number, and optionally applicable communication rate codes or tariffs, network access information, and the like.

In one embodiment, a request received by the service mapping server 104 from a mobile device 102 for service provider information of a phone number includes the phone number and identifying information of the mobile device 102 making the request (e.g., International Mobile Subscriber Identity (IMSI) of a SIM card of the device 102 and a phone number or area code of the SIM card). In one embodiment, when the service mapping server 104 receives a request from a mobile device 102 for service provider information of a phone number, the service mapping server 104 searches the database 106 for the service provider using the phone number and optionally an IMSI associated with the phone number.

If the database 106 does not have the phone number, service mapping server 104 transmits a message to the mobile device 102 indicating that service provider information is not available for the phone number. On the other hand, if the phone number is indentified in the database 106, the service mapping server 104 retrieves from the database 106 service provider information of the phone number and transmits the information to the mobile device 102.

In one embodiment, accounting information is stored of the transmittal for charging a user of the mobile device 102. Accounting information may include, for example, a time and date of the transmittal, the phone number for which service provider information was provided, and identifying information of the mobile device 102.

In one embodiment, a user of a mobile device 102 is charged a fee by an administrative entity of the server 104 each time service provider information of a phone number is provided to the device 102. In one embodiment, a user of a mobile device 102 is charged a fee each time the mobile device 102 communicates with the service mapping server 104. In another embodiment, a user of a mobile device 102 is charged a periodic fee (e.g., a monthly fee) or a onetime fee for having access to the service mapping server 104.

The wireless network 108 is a communication pathway for mobile devices 102. In one embodiment, the wireless network 108 is one or more cellular networks that include multiple base stations, controllers, and one or more core networks that typically includes multiple switching entities and gateways. In one embodiment, a cellular network uses one or more of the following technologies: GERAN (Global System for Mobile Communications (GSM) Edge Radio Access Network), U-TRAN (Universal Mobile Telecommunications System (UMTS) Terrestrial Radio Access Network), E-UTRAN (Evolved UTRAN), Worldwide Interoperability for Microwave Access (WiMAX), and Long Term Evolution (LTE). Gateways are provided from these radio access networks to the Internet 110, such as via a Service GPRS Support Node/Mobile Management Entity for a GERAN, or a Serving Gateway and Packet Data Network Gateway for a UTRAN.

In one embodiment, mobile devices 102 communicate in a cellular network via radio frequencies. In one embodiment, each mobile telecommunications service provider is allocated certain frequencies to allow subscribers of the service provider to communicate. The frequencies allocated to a service provider are referred to collectively as the network of the service provider herein.

II. System Architecture

Figure 2:
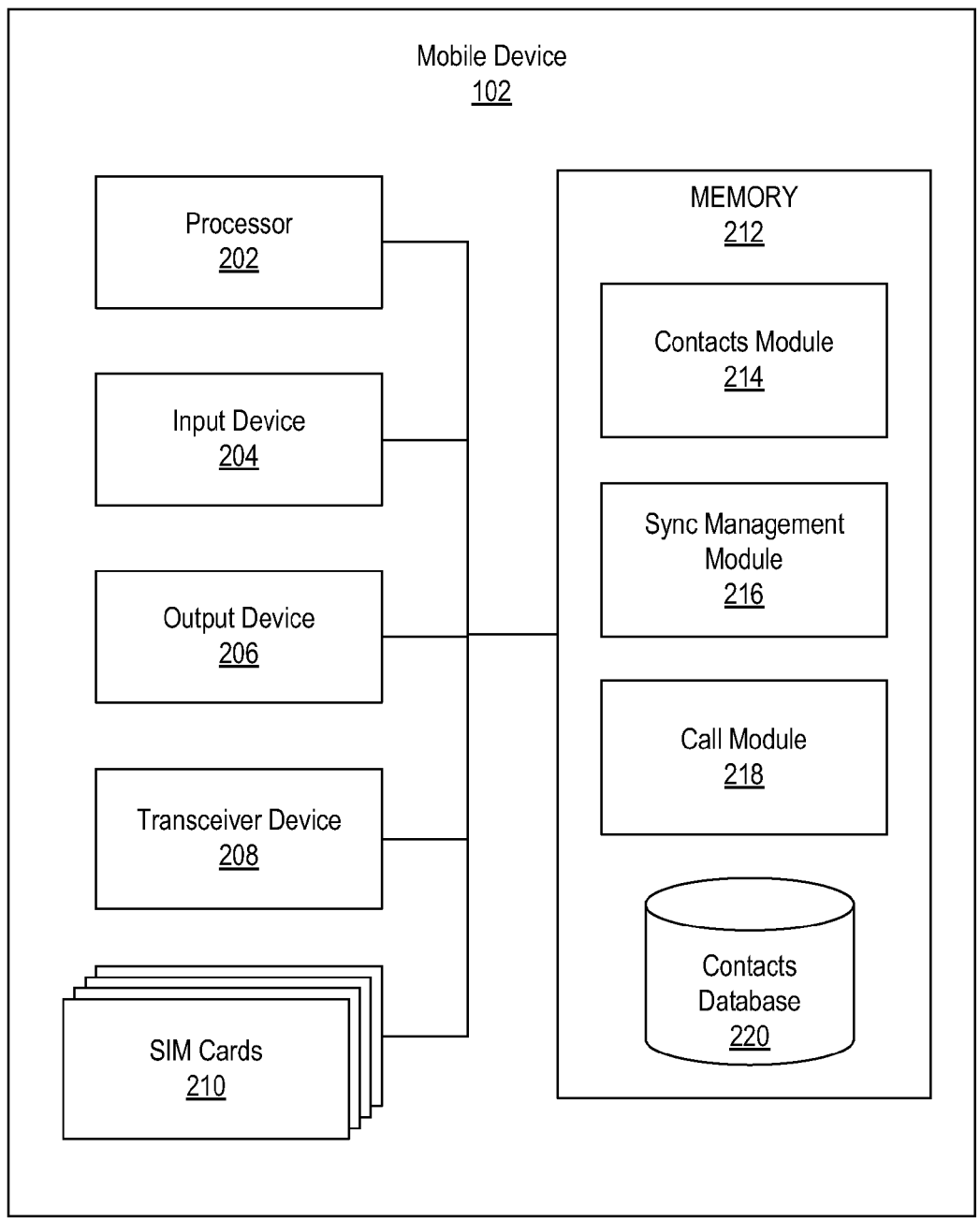
FIG. 2 is a block diagram illustrating a detailed view of a mobile device according to one embodiment.

FIG. 2 is a block diagram illustrating a detailed view of a mobile device 102 according to one embodiment. The mobile device 102 includes a processor 202, an input device 204, an output device 206, a transceiver device 208, multiple SIM cards 210, and a memory 212.

The processor 202 processes instructions and may comprise various computing architectures including a complex instruction set computer (CISC) architecture, a reduced instruction set computer (RISC) architecture, or an architecture implementing a combination of instruction sets. The processor 202 comprises an arithmetic logic unit, a microprocessor, or some other information appliance equipped to transmit, receive and process electronic data signals from the memory 212, the input device 204, the output device 206, the transceiver device 208, or the SIM cards 210.

The input device 204 is a device configured to provide user inputs to the mobile device 102. In one embodiment, the input device 204 is an alphanumeric input device, such as a QWERTY keyboard, a key pad or representations of such created on a touch screen adapted to communicate information and/or command selections to the processor 202. In one embodiment, the input device 204 is a user input device equipped to communicate positional data as well as command selections to the processor 202 such as a trackball, a stylus, a pen, a touch screen, cursor direction keys or other mechanisms to cause movement adjustment of an image.

The output device 206 is a device equipped to display electronic images and data as described herein. Output device 206 may be, for example, a liquid crystal display (LCD), light emitting diode display (LED), or any other similarly equipped display device. In one embodiment, the output device 206 is equipped with a touch screen in which a touch-sensitive, transparent panel covers the screen of output device 206.

The transceiver device 208 is a device that receives and transmits information via the wireless network 108. The information received and transmitted by the transceiver device 208 is carried in radio frequency signals. The transceiver device 208 allows the mobile device 102 to communicate with other mobile devices 102, the service mapping server 104, and other devices connected to the wireless network 108 and the Internet 110.

The SIM cards 210 are integrated circuits that store information. In one embodiment, each SIM card stores identifying information that identifies a subscriber of a mobile telecommunications service provider. In one embodiment, the identifying information includes an IMSI of the subscriber, an authentication key, and/or a phone number of the subscriber. The identifying information allows the mobile device 102 to access the network of the service provider. Other information that may be stored in a SIM card includes information that uniquely identifies the SIM card (e.g., integrated circuit card identifier (ICCID)), network state information, configuration information, and account information. In one embodiment, each SIM cards can be removed from the mobile device 102.

The memory 212 stores instructions and data that may be executed by the processor 202 for performing the techniques described herein. The memory 212 is a non-transitory computer-readable storage medium, such as a dynamic random access memory (DRAM) device, a static random access memory (SRAM) device, Flash RAM (non-volatile storage), combinations of the above, or some other memory device known in the art. The memory 212 includes a contacts module 214, a sync management module 216, a call module 218, and a contacts database 220. As used herein, the term "module" refers to computer program instruction and other logic for providing a specified functionality. The processor 202 is adapted to execute modules for providing the functionality described herein.

The sync management module 216 generally manages the functionality of associating phone numbers and contacts with individual SIM cards 210 in the mobile device 102. More specifically, the sync management module 216 manages use cases including making a telephone call, adding/editing a phone number for a contact, configuring the sync management module's own functionality, as further described below. In one embodiment, the sync management module 216 is an installable application that can be, for example, retrieved from online application store.

The contacts module 214 manages a contact database 220 of the mobile device 102. In one embodiment, the contacts database 220 stores phone numbers of contacts. A contact is an entity, such as a person or a business.

The contacts module 214 receives requests to add phone numbers to the database 220 for contacts. A request may be, for example, to add a phone number for a new contact, to add a new phone number for an existing contract, or for a phone number to replace a stored number of a contact. When a user of the mobile device 102 requests to add a phone number for a new contact, the contacts module 214 stores the name of the contact and the phone number in the contacts database 220. Other contact information of the contact may also be stored, such as a job title and an e-mail address of the contact. When a user of the device 102 requests to add a new phone number for an existing contact, the contacts module 214 stores the phone number in the contacts database 220 as being a number of the contact. When a user of the device 102 requests for a phone number to replace a stored phone number of a contact, the contacts module 214 identifies the contact in the database 220 and replaces the currently stored phone number of the contact in the database 220 with the phone number received.

In one embodiment, when a user requests to add a phone number for a contact, the sync management module 216 presents an interface to the user inquiring whether the user would like to activate the automatic SIM card selection feature for the phone number. Activating the automatic SIM card selection feature for a phone number is referred to herein as "syncing." Syncing the phone number with the feature signifies that the mobile device 102 will automatically select a SIM card for a call to the phone number based on service provider information provided by the service mapping server 104 for the phone number. In one embodiment, the user is notified that there is a fee associated with syncing the phone number. In one embodiment, if the user requests to sync the phone number with the feature, the sync management module 216 causes the contacts module 214 to store an indicator with the phone number in the database 220 indicating that the phone number is synced with the feature. As indicated above, the sync management module 216 can also enable the user to sync all of the phone numbers of a given contact.

In one embodiment, if the user requests to sync the phone number with the feature, the sync management module 216 transmits to the service mapping server 104 through the transceiver device 208 a request for service provider information of the phone number. In one embodiment, in addition to the phone number, identifying information of a SIM card 210 of the device 102 is transmitted with the request (e.g., identifying information of a SIM card 210 in a first slot of the device 102 or a default SIM card).

If the requested service provider information is received from the service mapping server 104, the sync management module 216 causes the contacts module 214 to store the service provider information in the database 220 along with the phone number. In one embodiment, when requesting service provider information of the added phone number, the sync management module 216 also requests service provider information of any other phone numbers that are synced for purposes of updating the service provider information of the phone numbers in the database 220.

In one embodiment, the sync management module 216 periodically updates service provider information for the synced phone numbers in the contacts database 220. In one embodiment, periodically (e.g., once a month) the sync management module 216 identifies each phone number in the database 220 synced with the automatic SIM card selection feature. The sync management module 216 requests and receives service provider information for each identified phone number from the service mapping server 104. If the stored service provider information of a phone number has changed, the sync management module 216 causes the contacts module 214 to update the database 220 to include the latest service provider information received by the contacts module 214 from the service mapping server 104.

The contacts module 214 receives requests for phone numbers of contacts. In one embodiment, when a user of the mobile device 102 request the phone number of a contact, the contacts module 214 identifies the phone number of the contact in the contacts database 220. The contacts module 214 retrieves the phone number from the database 220 and presents the number to the user via the output device 206.

The sync management module 216 allows a user to enable or disable the automatic SIM card selection feature for the mobile device 102. In one embodiment, if a user of the mobile device 102 requests to edit the settings of the automatic SIM card selection feature, the sync management module 216 presents an interface to the user where the user can request to enable or disable the sync feature for the device 102. If the user requests to disable the feature, when a request is made to place a call to a phone number, a SIM card is not automatically selected for the call even if the phone number is synced with the feature. In other words, disabling the feature for the device 102, overrides the syncing of the phone number. On the other hand, if the user requests to enable the feature, when a request is made to place a call to a phone number that is synced with the feature, one of the multiple SIM cards 210 is automatically selected for the call based on information provided by the service mapping server 104.

The call module 218 enables the placement of calls using the mobile device 102. In one embodiment, when a user of the mobile device 102 request to call a phone number, the sync management module 216 determines whether the automatic SIM card selection feature is enabled for the device 102. If the feature is disabled, the sync management module 216 presents an interface to the user asking the user to select one of the SIM cards 210 of the device 102 for the call. The sync management module 216 instructs the call module 218 to use the selected SIM card for the call. The call module 218 retrieves identifying information from the selected SIM card and places the call through the transceiver device 208 using the retrieved identifying information.

If the feature is enabled, the sync management module 216 determines whether the phone number being called is synced with the automatic SIM card selection feature. In one embodiment, if the phone number is not synched, the sync management module 216 presents the interface to the user that asks the user to select a SIM card for the call, as described above. In one embodiment, information is stored as to which SIM card is selected by the user so that next time the user requests to call the phone number, the same SIM card is automatically used for the call by the call module 218. In another embodiment, if the phone number is not synced, the sync management module 216 presents an interface asking the user whether to sync the number. If the user requests to sync the number, the sync management module 216 syncs the number as described above by obtaining service provider information for the phone number. Once the phone number is synched, the call is made as described below. If the user requests not to sync the number, the sync management module 216 presents the interface asking the user to select a SIM card, as described above.

In one embodiment, if the feature is enabled and the phone number is synced, the sync management module 216 retrieves from the contacts database 220 service provider information obtained from the service mapping server 104 for the phone number. If the service provider information in the database 220 for the phone number has not been updated within a certain period of time or if there is no service provider information in the database 220 for the phone number, the sync management module 216 requests and receives the information for the number from the service mapping server 104. Alternatively, the sync management module 216 requests and receives service provider information from the server 102 regardless of whether the contacts database 220 currently includes information for the phone number. This could be done, for example, to make sure the call module 218 has the latest information.

The synch management module 216 determines the service provider of the phone number based on the service provider information obtained from the service mapping server 104. The synch management module 216 selects a SIM card for the call storing identifying information of a subscriber of the phone number's service provider. The synch management module 216 instructs the call module 218 to use the selected SIM card for the call. The call module 218 retrieves the identifying information from the selected SIM card and places the call to the phone number using the retrieved identifying information.

Figure 3:
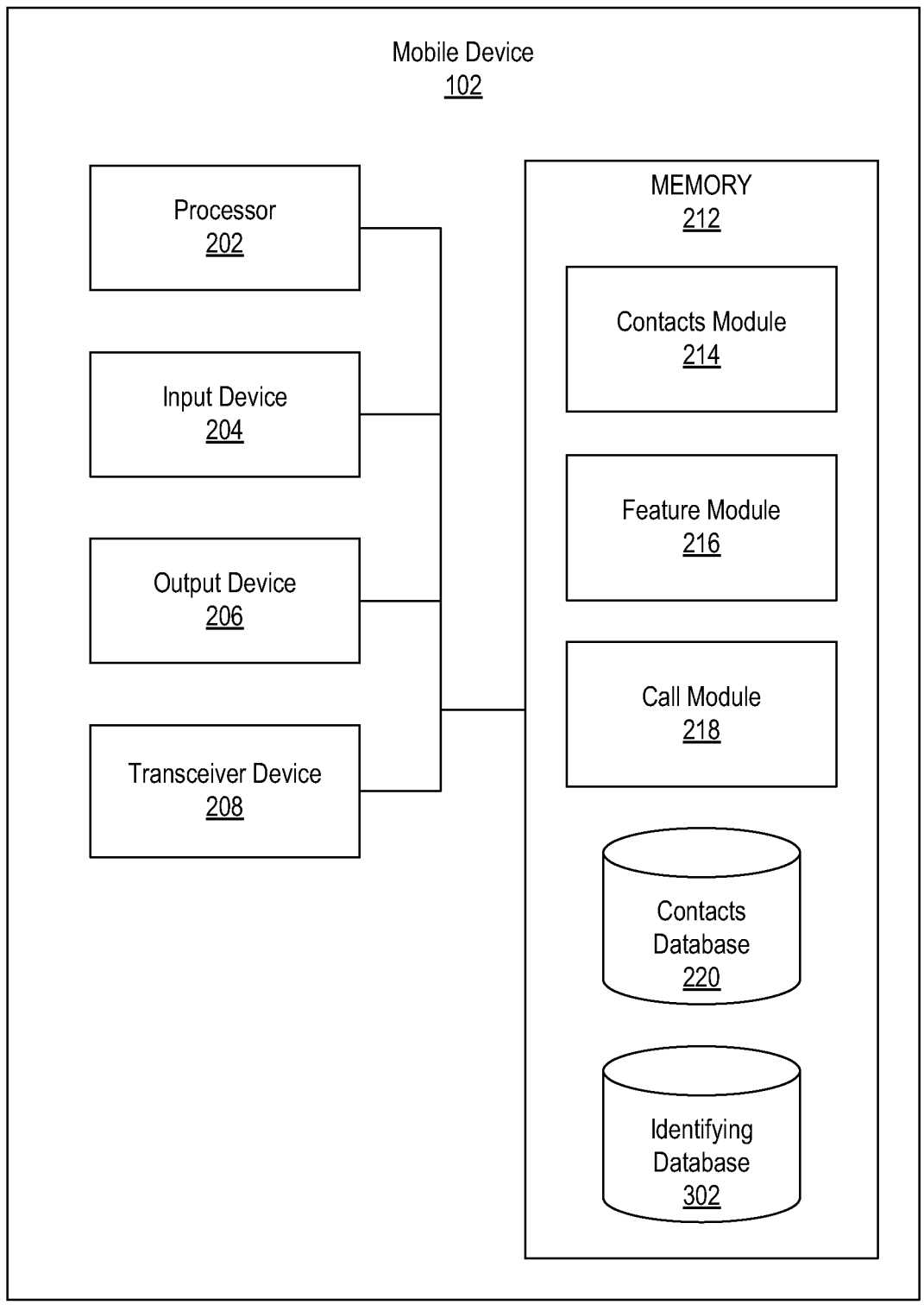
FIG. 3 is a block diagram illustrating a detailed view of a mobile device according to an alternative embodiment.

FIG. 3 is a block diagram illustrating a detailed view of a mobile device 102 according to an alternative embodiment. The architecture of the mobile device 102 is similar to that of FIG. 3, except the SIM cards of FIG. 2 are replaced with an identifying database 302 in memory 212. In other words, instead of identifying information of service provider subscribers being stored in multiple SIM cards 210, the identifying information is stored in an indentifying database 302 of the memory 212. For example, the identifying database 302 may store identifying information of a subscriber of service provider A and the identifying information of a subscriber of service provider B. In one embodiment, the identifying information is stored by a user of the mobile device 102. In another embodiment, the identifying information is stored by one or more mobile telecommunications service providers.

In this embodiment, when the sync management module 216 determines the service provider of a phone number that a user requested be called based on information provided by the service mapping server 104, the call module 218 retrieves identifying information of a subscriber of the phone number's service provider from the identifying database 302. The call module 218 places the call to the phone number through the transceiver device 208 using the retrieved identifying information. In this embodiment, the feature of automatically selecting the identifying information for the call from the identifying database 302 based on information obtained from the service mapping server 104 is referred to as the automatic selection feature.

The embodiments described above have described the mobile device 102 automatically selecting which SIM card or identifying information to use for a call based on information received from the service mapping server 104. However, in other embodiments, the selection may be made by the service mapping server 104. For example, when a user of a mobile device 102 with multiple SIM cards requests to place a call to a phone number, the mobile device 102 can provide the phone number to the service mapping server 104 and the server 104 can select which of the multiple SIM cards to use for the call based on information stored in the service provider database 106. The service mapping server 104 instructs the mobile device 102 to use the selected SIM card for the call.

III. Process

Figure 4:
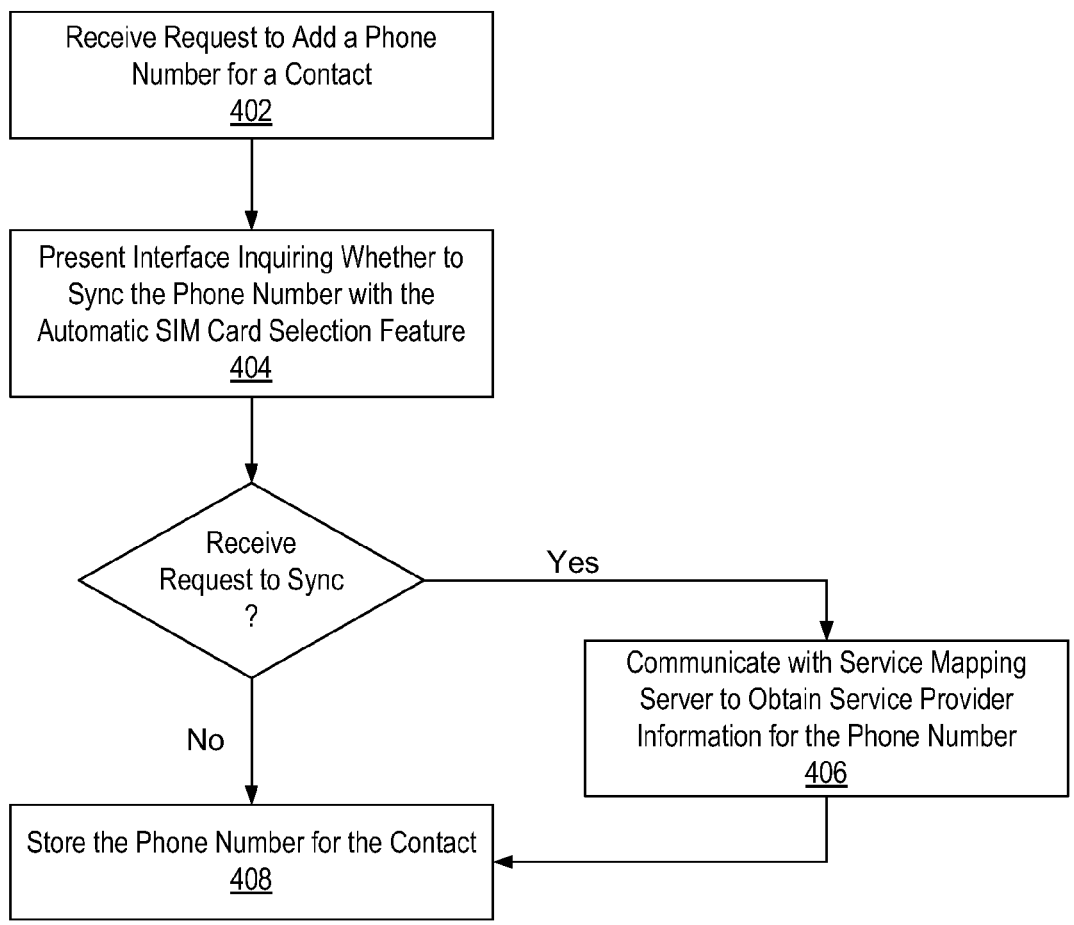
FIG. 4 is a flow chart illustrating operations of a mobile device in adding a phone number according to one embodiment.

FIG. 4 is a flow chart 400 illustrating operations of a mobile device 102 in adding a phone number according to one embodiment. The mobile device 102 receives 402 a request from a user of the mobile device 102 to add a phone number for a contact. The request may be for a new contact, for a new phone number of an existing contact, or to replace a stored number of a contact with the received phone number. The mobile device 102 presents 404 an interface to the user inquiring whether to sync the phone number with the automatic SIM card selection feature.

If the user requests to sync the phone number, the mobile device 102 communicates 406 with the service mapping server 104 to obtain service provider information for the phone number. The mapping server 104 accesses its internal database 106 and lookups the service provider information associated with the phone number, and returns this information to the mobile device 102. The mobile device 102 stores 408 the phone number along with the service provider information. On the other hand, if the user requests not to sync the phone number, the mobile device 102 skips to step 408 and stores the phone number.

Figure 5:
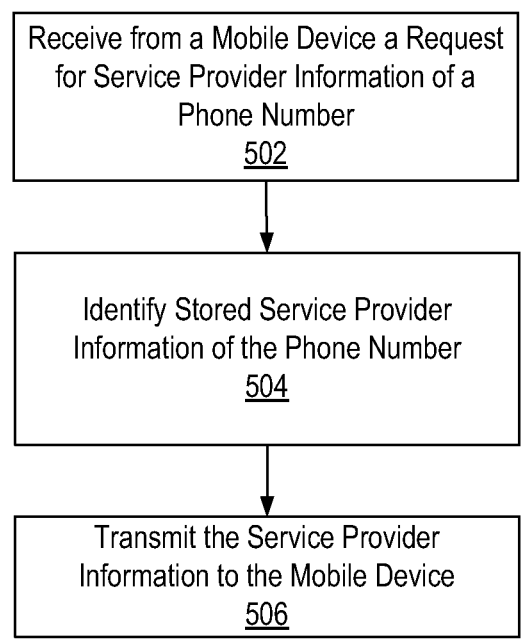
FIG. 5 is a flow chart illustrating operations of a service mapping server in processing a request for service provider information of a phone number according to one embodiment.

FIG. 5 is a flow chart 500 illustrating operations of a service mapping server 104 in processing a request for service provider information of a phone number according to one embodiment. When the service mapping server 104 receives 502 a request for service provider information of a phone number, the service mapping server 104 identifies 504 stored service provider information of the phone number from the service provider database 106. The service mapping server 104 transmits 506 the service provider information to the mobile device 102.

The service mapping server 104 can be populated with the associations between phones and service providers using manual data entry, bulk uploads of data retrieved from various services provides, as well as a combination of these approaches. The service mapping server 104 is configured to expose application programming interfaces by which service providers can upload the lists of telephone numbers of subscribers to their respective networks.

Figure 6:
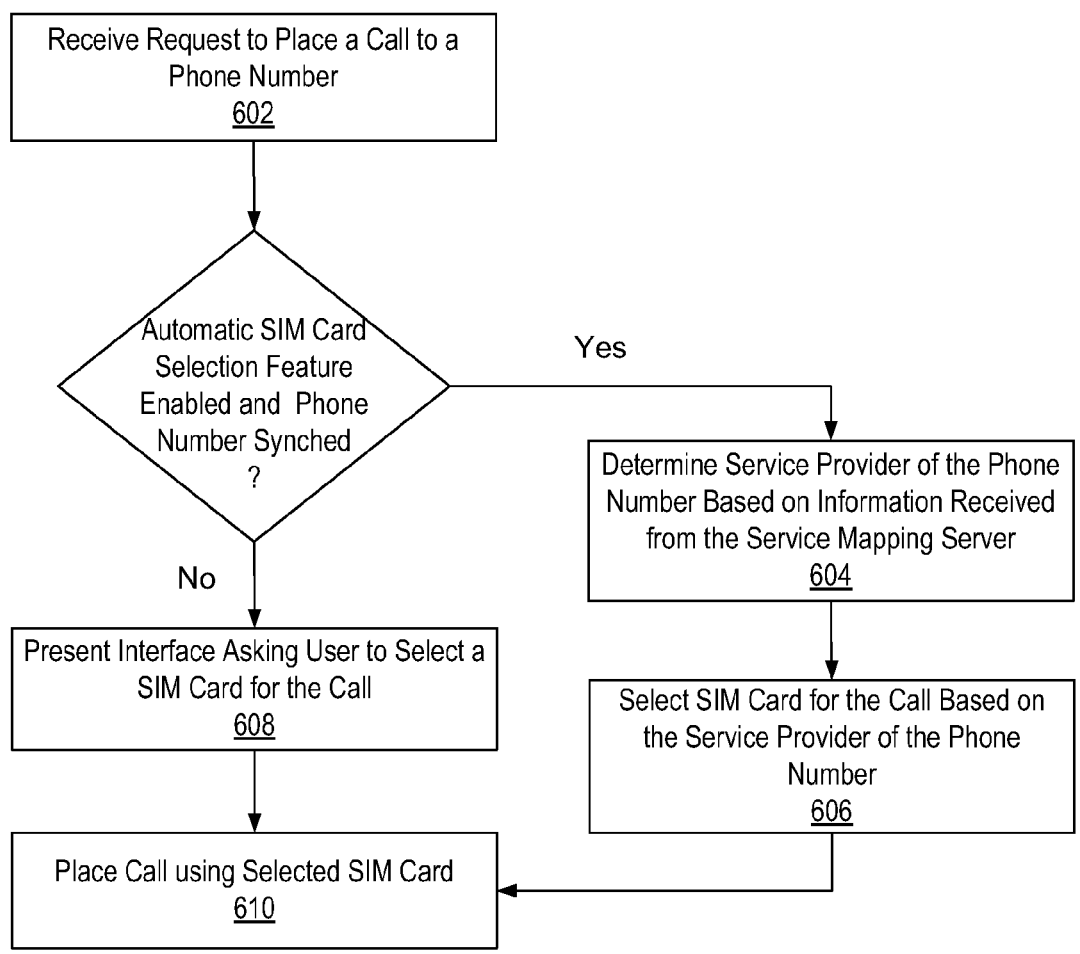
FIG. 6 is a flow chart illustrating operations of a mobile device in processing a request to place a call according to one embodiment.

FIG. 6 is a flow chart 600 illustrating operations of a mobile device 102 in processing a request to place a call according to one embodiment. Assume for purposes of this example that the mobile device 102 includes multiple SIM cards. Each SIM card stores indentifying information of a subscriber of a service provider.

The mobile device 102 receives 602 a request to place a call to a phone number. If the automatic SIM card selection feature is enabled and the phone number is synced, the mobile device 102 determines 604 a service provider of the phone number based on service provider information received from the service mapping server 104. The mobile device 102 selects 606 a SIM card for the call based on the service provider of the phone number. In one embodiment, the mobile device 102 selects the SIM card storing indentifying information of a subscriber of the determined service provider. The mobile device 102 places 610 the call using the selected SIM card.

On the other hand, if the automatic SIM card selection feature is not enabled or the phone number is not synced, the mobile device 102 presents 608 an interface asking the user to select a SIM card for the call. The mobile device 102 places 610 the call using the selected SIM card.

Figure 7:
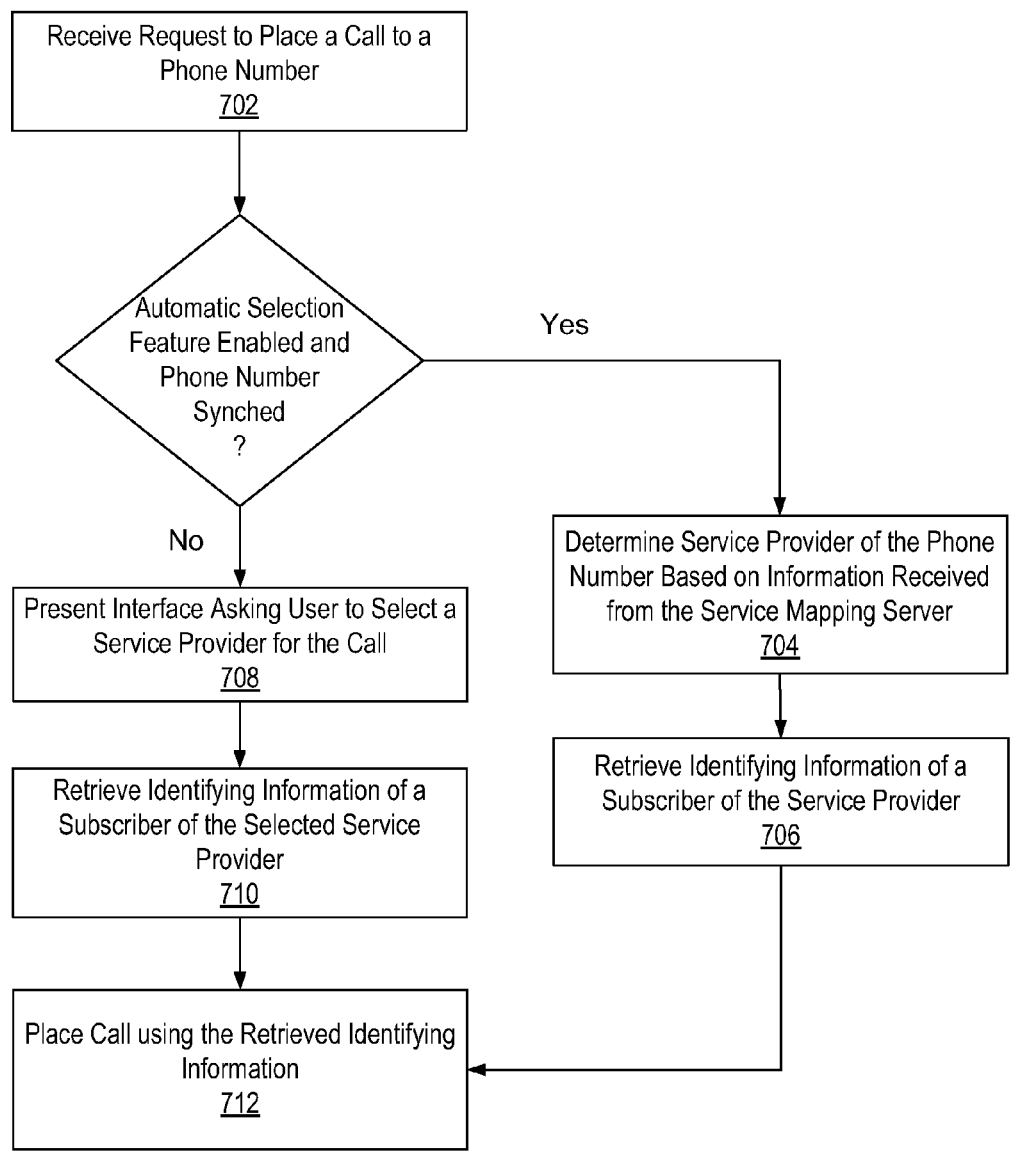
FIG. 7 is a flow chart illustrating operations of a mobile device in processing a request to place a call according to an alternative embodiment.

FIG. 7 is a flow chart 700 illustrating operations of a mobile device 102 in processing a request to place a call according to an alternative embodiment. Assume for purposes of this example that the mobile device 102 stores indentifying information of subscribers of service providers in an internal database of the mobile device 102 (e.g., identifying database 302 of FIG. 3) instead of in multiple SIM cards.

The mobile device 102 receives 702 a request to place a call to a phone number. If the automatic selection feature is enabled and the phone number is synced, the mobile device 102 determines 704 a service provider of the phone number based on service provider information received from the service mapping server 104. The mobile device 102 retrieves 706 identifying information of a subscriber of the determined service provider from the internal database of the device 102. The mobile device 102 places 712 the call using the retrieved identifying information.

On the other hand, if the phone number is not synced or the automatic selection feature is not enabled, the mobile device 102 presents 708 an interface asking the user to select a service provider for the call. The mobile device 102 retrieves 710 identifying information of a subscriber of the selected service provider. The mobile device 102 places 712 the call using the retrieved identify information.

Those of skill in the art will recognize that other embodiments can performs the steps of FIGS. 4-7 in different orders than described. Additionally, other embodiments may include different and/or additional steps than described.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The disclosure of the present invention is intended to be illustrative, but not limiting, of the full scope of the invention, which is set forth in the following claims.

What is claimed:

1. A computer-implemented method for processing a request to place a call, the method comprising:
   receiving, by a mobile device, a request to call a phone number, the mobile device including a plurality of subscriber identification module (SIM) cards, each of the plurality of SIM cards including information for accessing a network of a different service provider;
   automatically selecting, by the mobile device prior to placing the call to the phone number based on the request, a SIM card from the plurality of SIM cards that includes information for accessing a network of a service provider of the phone number, the service provider of the phone number determined based on service provider information received from a service mapping server for the phone number; and
   placing, by the mobile device, the call to the phone number using the information stored on the selected SIM card to directly access the network of the service provider of the phone number.

2. The method of claim 1, wherein the SIM card is automatically selected responsive to an automatic SIM card selection feature being enabled.

3. The method of claim 1, wherein the SIM card is automatically selected responsive to an automatic SIM card selection feature being activated for the phone number being called.

4. The method of claim 1, further comprising:
receiving a request to add the phone number for a contact;
communicating with the service mapping server to obtain the service provider information of the phone number, the service provider information indicating the service provider of the phone number; and
storing the phone number and the service provider information.

5. The method of claim 1, wherein the service provider information is obtained from the service mapping server for the phone number responsive to receiving the request to call the phone number.

6. The method of claim 1, wherein placing the call comprises:
retrieving from the selected SIM card identifying information of a subscriber of the service provider; and
calling the phone number using the identifying information.

7. The method of claim 6, wherein the identifying information allows the mobile device to access the network of the service provider of the phone number.

8. A non-transitory computer-readable storage medium having computer-executable instructions for processing a request to place a call, the computer-executable instructions configured to control a mobile device to perform operations comprising:
receiving, by the mobile device, a request to call a phone number, the mobile device including a plurality of subscriber identification module (SIM) cards, each of the plurality of SIM cards including information for accessing a network of a different service provider;
automatically selecting, by the mobile device prior to placing the call to the phone number based on the request, a SIM card from the plurality of SIM cards that includes information for accessing a network of a service provider of the phone number, the service provider of the phone number determined based on service provider information received from a service mapping server for the phone number; and
placing, by the mobile device, the call to the phone number using the selected SIM card to directly access the network of the service provider of the phone number.

9. The computer-readable storage medium of claim 8, wherein the SIM card is automatically selected responsive to an automatic SIM card selection feature being enabled.

10. The computer-readable storage medium of claim 8, wherein the SIM card is automatically selected responsive to an automatic SIM card selection feature being activated for the phone number being called.

11. The computer-readable storage medium of claim 8, further comprising:
receiving a request to add the phone number for a contact;
communicating with the service mapping server to obtain the service provider information of the phone number, the service provider information indicating the service provider of the phone number;
storing the phone number and the service provider information.

12. The computer-readable storage medium of claim 8, wherein the service provider information is obtained from the service mapping server for the phone number responsive to receiving the request to call the phone number.

13. The computer-readable storage medium of claim 8, wherein placing the call comprises:
retrieving from the selected SIM card identifying information of a subscriber of the service provider; and
calling the phone number using the identifying information.

14. The computer program product computer-readable storage medium of claim 13, wherein the identifying information allows the mobile device to access the network of the service provider of the phone number.

15. A mobile device for processing a request to place a call, the mobile device comprising:
a plurality of subscriber identification module (SIM) cards, each of the plurality of SIM cards including information for accessing a network of a different service provider;
one or more processors; and
a non-transitory computer-readable storage medium storing computer-executable instructions that when executed by the one or more processor are configured to cause the mobile device to perform operations comprising:
receiving a request to call a phone number;
automatically selecting, prior to placing the call to the phone number based on the request, a SIM card from the plurality of SIM cards that includes information for accessing a network of a service provider of the phone number, the service provider of the phone number determined based on service provider information received from a service mapping server for the phone number; and
placing the call to the phone number using the selected SIM card to directly access the network of the service provider of the phone number.

16. The mobile device of claim 15, wherein the SIM card is automatically selected responsive to an automatic SIM card selection feature being enabled.

17. The mobile device of claim 15, wherein the SIM card is automatically selected responsive to an automatic SIM card selection feature being activated for the phone number being called.

18. The mobile device of claim 15, wherein the computer-executable instructions are further configured to cause the mobile device to perform operations comprising:
receiving a request to add the phone number for a contact;
communicating with the service mapping server to obtain the service provider information of the phone number, the service provider information indicating the service provider of the phone number; and
storing the phone number and the service provider information.

19. The mobile device of claim 15, wherein the service provider information is obtained from the service mapping server for the phone number responsive to receiving the request to call the phone number.

20. The mobile device of claim 15, wherein placing the call comprises:
retrieving from the selected SIM card identifying information of a subscriber of the service provider; and
calling the phone number using the identifying information.

* * * * *